July 21, 1936.  D. B. GISH  2,048,117
COUPLING
Filed Feb. 21, 1936
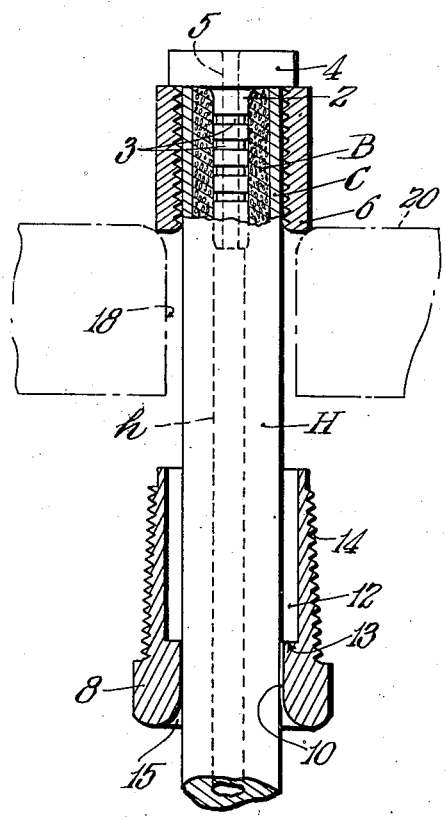
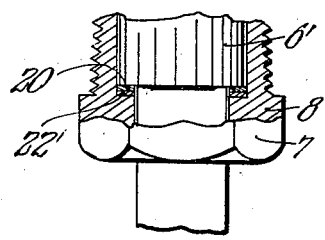
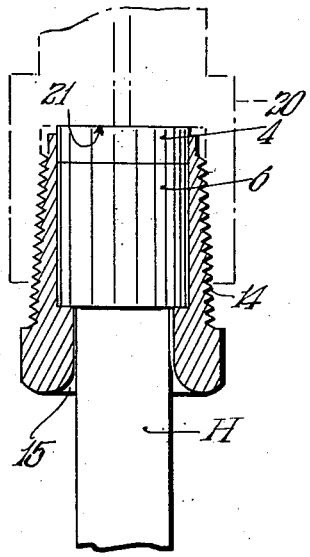
INVENTOR.
Daniel B. Gish.
BY Walter C. Ross.
ATTORNEY.

Patented July 21, 1936

2,048,117

UNITED STATES PATENT OFFICE 2,048,117

COUPLING

Daniel B. Gish, West Springfield, Mass.

Application February 21, 1936, Serial No. 65,056

2 Claims. (Cl. 285—84)

This invention relates to improvements in hose coupling structures.

The principal objects of the invention are directed to the provision of a novel method of and means for coupling flexible hose. One special feature of the invention is that an end of a hose is capped in such a way that the capped end may be received in a coupling member and when the said member is placed on another member, the capped end of the hose is locked between said members and prevented from displacement while leakage under high pressure is obviated.

Another special feature of the invention is the provision of means to facilitate the connecting of a hose to a part which is of such a character as to withstand the ever increasing requirements of high pressures.

Various and numerous novel objects and advantages of the invention will be hereinafter more fully referred to in connection with the accompanying description of the present preferred form of the invention, reference being had to the accompanying drawing wherein:

Fig. 1 is a partial elevational and sectional view to explain the features of the invention;

Fig. 2 is a view similar to Fig. 1 showing the parts of Fig. 1 in assembled relation; and Fig. 3 is a partial sectional view similar to Fig. 2 to explain a modified form of the invention.

Referring now to the drawing more in detail, the novel features of the invention will be fully described.

In the drawing, a hose is represented at H which is of the flexible type. Its wall may include a body part indicated by B which may be made up of layers of fabricated material and an outer covering or sheath C. The covering is usually of a rubber composition or the like adapted to function as a protection of the fabricated material and yet permit the desired flexing of the hose.

A tail-piece is provided which has a stem 2 and a flange or head 4. The tail-piece is hollow as at 5 and the stem 2 is adapted for insertion in the bore $h$ of the hose H with the head part 4 abutting the end of the hose H. A cap member 6 in the form of a sleeve is provided with a central bore to receive the hose H. The bore of the member 6 is roughened or has a plurality of barbs or projections for impinging the hose. These may be formed in any well-known manner as by a screw-thread or threads formed in the internal bore of this sleeve or cap member.

The stem of the tail-piece is preferably roughened and this may be accomplished by grooves such as 3 or the like to provide alternate grooves, ridges, or barbs.

The cap member is arranged so that it may slide along the hose and in assembling the parts it is moved into abutment with the head 4 of the tail-piece. When so located it is compressed or reduced in diameter as will later appear.

A coupling member such as 8 is provided which has a bore 10 so that it may slide along the hose H. An enlarged socket 12 above the bore provides a shoulder 13. The entrance 15 to the bore 10 is chamfered or given a radius as shown for purposes to be later described and at the lower outside end of the member 8 or at some convenient place there is a non-round part to facilitate the member 8 being turned. In the form of the invention this is shown in Fig. 3 as being a hex 7.

The coupling member 8 shown has a threaded portion 14 so that it may be connected to or engaged with another part but in lieu of the specific construction shown the member 8 may have a female threaded part instead of the male thread shown.

In assembling the parts the cap member or sleeve 6 is brought into abutment with the head 4 of the tail-piece and when in this position the part 6 is contracted or reduced in diameter so as to squeeze the hose between its internal bore $h$ and the stem 2. This may be accomplished in one way by forcing the member 6 downwardly through the bore 18 of a die 20, said die being represented by dot-dash lines.

As the part 6 is moved downwardly through the die it is compressed or reduced in diameter so that the wall of the hose is squeezed or compressed between the wall of part 6 and the stem part 2 of the tail-piece. The projections or barbs on the interior bore of the cap 6 impinge and grip the wall or the hose while the barbs of the stem 2 impinge the wall of the bore of the hose.

The cap member 6 is reduced to such a diameter that it is a tight fit in the socket 12 of the coupling member 8. In the form of the invention shown in Fig. 1 the said cap member is pressed into the said socket 12 so that the parts are in the relation shown in Fig. 2.

With the parts assembled, as shown in Fig. 2, the lower end of the cap member 6 abuts the shoulder 13 at the lower end of the socket 12. Then when the coupling member 8 is connected to another part indicated by dot-dash lines 20 the end face of the head 4 of the tail-piece is brought up against the end part 21 of the socket in the member 20. In this way the end of the hose H is capped by the member 6 so as to be locked between members 8 and 20. By being so locked, the hose H is prevented from being forced outwardly through the bore 10 of member 8. That is by locking the cap member 6 and head 4 between the coupling members 8 and 20 and since the tail-piece and cap at the end of hose are locked together, the end of the hose is securely locked as desired.

In lieu of the socket 12 in member 8 which provides the shoulder 13 the said socket may be tapering and the die through which the cap 6 is pressed may have a tapering hole whereby when the cap is compressed onto the hose its exterior has a taper to conform with the taper of the socket. Then the parts may be locked in the manner described so that capped end of the hose may not be forced through the outer or lower end of the coupling member 8.

The chamfer 15 of the bore 10 of coupling 8 is important in that it allows the hose H to be bent sharply adjacent the end of the coupling member 8. There are no sharp corners or confining edges which may injure the covering of the hose and therefore a hose may be used which has a relatively thin covering.

Heretofore hose of this type has had a relatively thick cover because the end of the coupling which was compressed over the hose formed an abrupt and cutting edge, making the heavy or thick covering necessary. In this case the part actually gripping the hose is within the coupling member obviating confining parts where the hose enters the coupling making it possible to provide a substantial radius at the end of the coupling where the hose enters whereby the hose may withstand the flexing or bending without injury thereto.

By reason of the novel construction referred to it is possible as stated to use a hose having a relatively thin outer covering which contributes not only to produce the desired flexibility of the hose but also makes it possible to employ a hose of less cost.

In the modification of the invention shown in Fig. 3, the cap member indicated by 6' has a diameter which is slightly less than the diameter of the socket in the member 8 whereby the member 8 may turn relative to the cap member as when connecting member 8 to a member such as 20. To facilitate the easy turning there may be one or more washers such as 20' and 22' in the bottom part of the socket of member 8.

A washer or washers facilitates the rotation of coupling part 8 into another part so as to bring the end face of the head of the tail-piece against its seat which is necessary in order to connect the hose.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. The combination of a length of hose with a coupling means comprising, a tail-piece member having a body part extending into the bore of one end portion of the hose and a head part outside the end of the hose, a tubular shell member around said end portion of the hose and compressed substantially throughout its length thereabout to grip said hose with its upper end abutting the under side of said head, and a coupling member provided with upper and lower bores of substantially uniform and different diameters between which is a shoulder, the upper bore receiving said shell member with its lower end on said shoulder and the lower bore receiving the part of the hose which is immediately adjacent the lower side of said shell member.

2. The combination of a length of hose with a coupling means comprising, a hollow tail-piece member having a body part extending into the bore of one end portion of the hose and an enlarged disc-like head part outside the end of the hose, a tubular shell member extending around said end portion of the hose and compressed substantially throughout its length thereabout to grip said hose and form a unit with its upper end in abutment with the underside of said head part, and a unitary coupling member provided with upper and lower bores of substantially uniform and different diameters, the upper bore receiving said shell member and the lower bore receiving that part of the hose which is immediately adjacent the lower side of the shell member, the unitary coupling member being rotatable relative to said unit.

DANIEL B. GISH.